United States Patent [19]

Brozel et al.

[11] 4,213,330

[45] Jul. 22, 1980

[54] MACHINE FOR MEASURING THE MOMENTS OF INERTIA

[76] Inventors: Rudolf Brozel, 22 Allee de Chaponval, F 78590 Noisy-le-Roi, France; Kurt Beckel, B. Zweerslaan 4, NL-Voorscmoten; Jan Berkhout, Van Iersellaan 25, NL-Noordwykerhout, both of Netherlands

[21] Appl. No.: 953,846

[22] Filed: Oct. 23, 1978

[30] Foreign Application Priority Data

Oct. 28, 1977 [BE] Belgium ............................ 0182183

[51] Int. Cl.$^2$ .............................................. G01M 1/12
[52] U.S. Cl. ............................................ 73/65; 73/487
[58] Field of Search ...................... 73/65, 66, 505, 487

[56] References Cited

U.S. PATENT DOCUMENTS

| 3,040,563 | 6/1962 | Eckles et al. | 73/65 |
| 3,377,845 | 4/1968 | Conn | 73/65 |

OTHER PUBLICATIONS

Phillips, M. S., Moment of Inertia System, from Instruments and Control Systems, vol. 39, Nov. 1966, pp. 85–89.

*Primary Examiner*—Jerry W. Myracle
*Attorney, Agent, or Firm*—Hill, Van Santen, Steadman, Chiara & Simpson

[57] ABSTRACT

A machine which allows the moments of inertia of an appliance to be measured relative to two axes without the configuration of the machine to be modified in any way. This machine comprises a fixed horizontal plate and an oscillating table mounted with a vertical shaft so as to be capable of oscillation about the longitudinal axis of said rotary shaft. The oscillating table is supported on the fixed plate by means of a plurality of pneumatic support devices spaced from and arranged symmetrically around the rotary shaft, the latter extending through the fixed plate and being centered in the central opening in the fixed plate by radial bearing elements, e.g. gas bearing elements.

3 Claims, 7 Drawing Figures

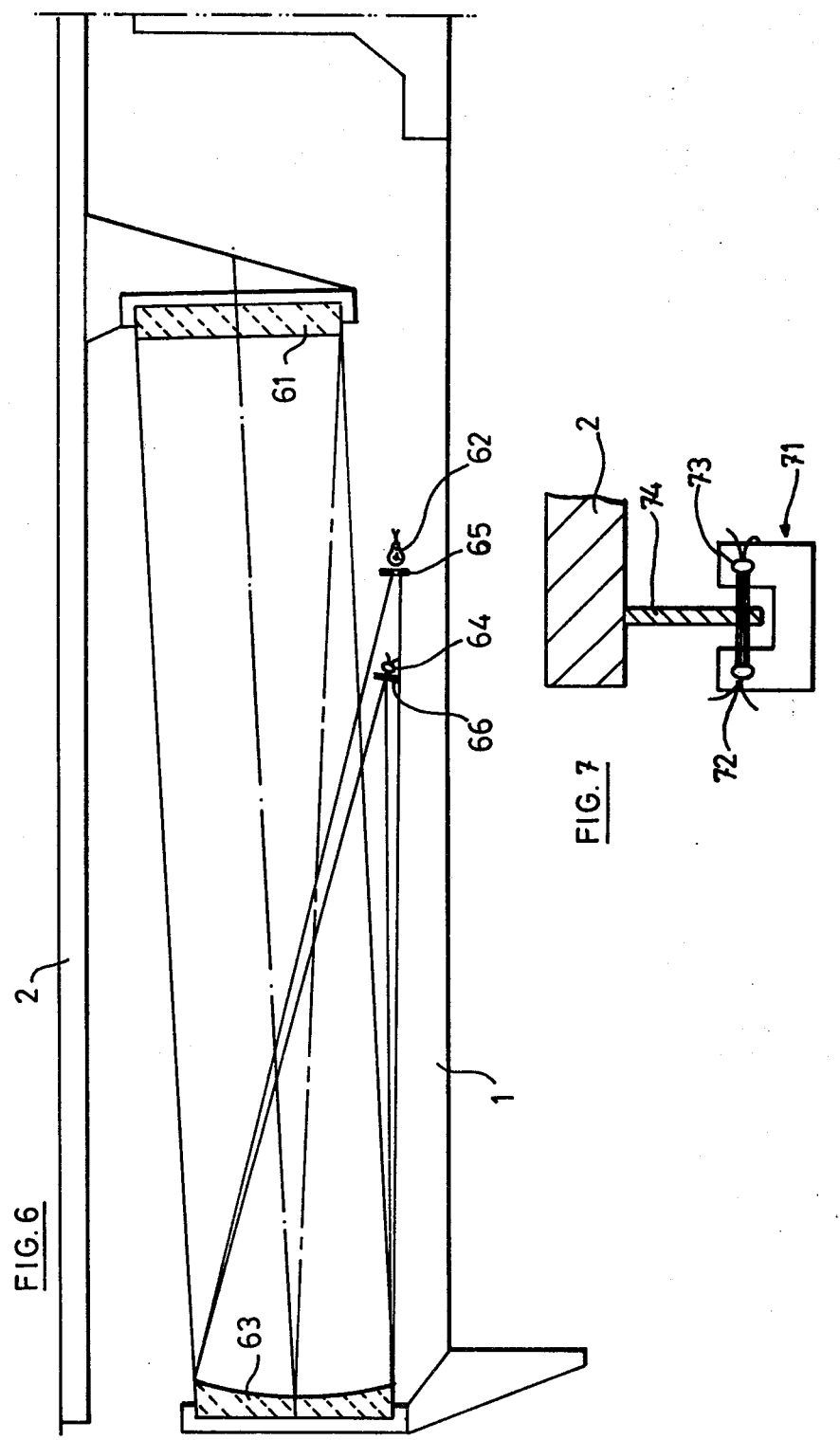

MACHINE FOR MEASURING THE MOMENTS OF INERTIA

BACKGROUND OF THE INVENTION

The present invention relates to a machine for measuring the moments of inertia of an artificial satellite along two axes of rotation.

The methods of measuring the moment of inertia are based on Newton's law, $T = \phi I$ in which I is the moment of inertia about the axis of rotation, $\phi$ is the angular acceleration of the satellite and T is the couple applied. As the angular acceleration $\phi$ is difficult to measure, most of the known machines make use of a torsional vibration applying a force or torque T proportional to the angular displacement of the satellite. Measurement of the vibration frequency or period allows the moment of inertia I to be obtained.

The known machines for measuring the moment of inertia are mainly harmonic oscillator-type machines using flexible pivots or gas bearings for determining the axis of rotation of a vibrating table upon which is fixed the satellite to be tested.

The known machines allow the absolute value of the moment of inertia relative to an axis of rotation to be measured. When it is desired to determine the moments of inertia relative to two axes of rotation, the moment of inertia relative to the axis of rotation of an artificial satellite and the lateral moment of inertia, for example, the known machines make it necessary to effect consecutive measurements while modifying the mechanical and dynamic configuration of the machine, which modifies the test conditions from one measurement to another so that these measurements are not precisely comparable.

SUMMARY OF THE INVENTION

The invention relates to a machine which allows the moment of inertia of an engine or appliance to be measured relative to two axes without the configuration of the machine being modified in any way.

The invention also relates to a machine for measuring the difference between the moments of inertia relative to two axes, rather than their absolute values.

The machine according to the invention is characterised by comprising a fixed plate and a vibrating or oscillating table which is centered by a radial bearing and supported on the fixed plate by means of a plurality of pneumatic support devices spaced away from and arranged symmetrically around the rotating shaft.

In a preferred embodiment the vibrating table comprises a vertical part erected on the horizontal table, said table and said vertical part each bearing a fastening device for the engine or appliance to be tested.

BRIEF DESCRIPTION OF THE DRAWINGS

An exemplary embodiment is described below with reference to the accompanying drawings in which:

FIG. 6 schematically illustrates the device for measuring the period of oscillation of the table;

FIG. 7 is a schematic illustration showing a photoelectric circuit breaking device used for measuring the oscillation amplitude ot the table.

DESCRIPTION OF AN EXEMPLARY EMBODIMENT

Figure 1:
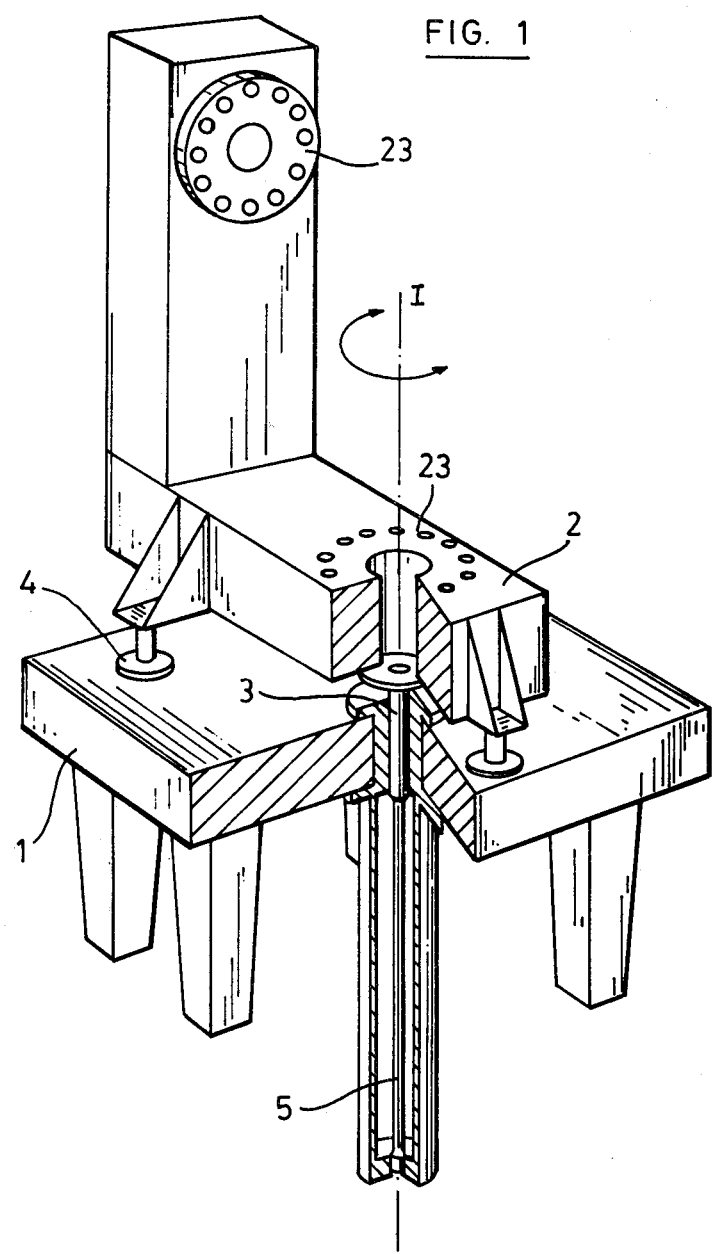
FIG. 1 is a perspective view of a machine according to the invention with a partial cut-away section showing the central rotary shaft.

With reference to FIG. 1, it can be seen that the machine comprises a fixed horizontal plate 1 and an oscillating or vibrating table 2 consisting of one section having two parts at right angles to one another: a horizontal part 21 and a vertical part 22 which extends upwards from the end of the horizontal part 21. Each of the parts 21 and 22 bears a fastening device 23 for securing the machine to be tested in order to measure the moments of inertia along two axes of the machine, as will be seen further on in the description.

Figure 2:
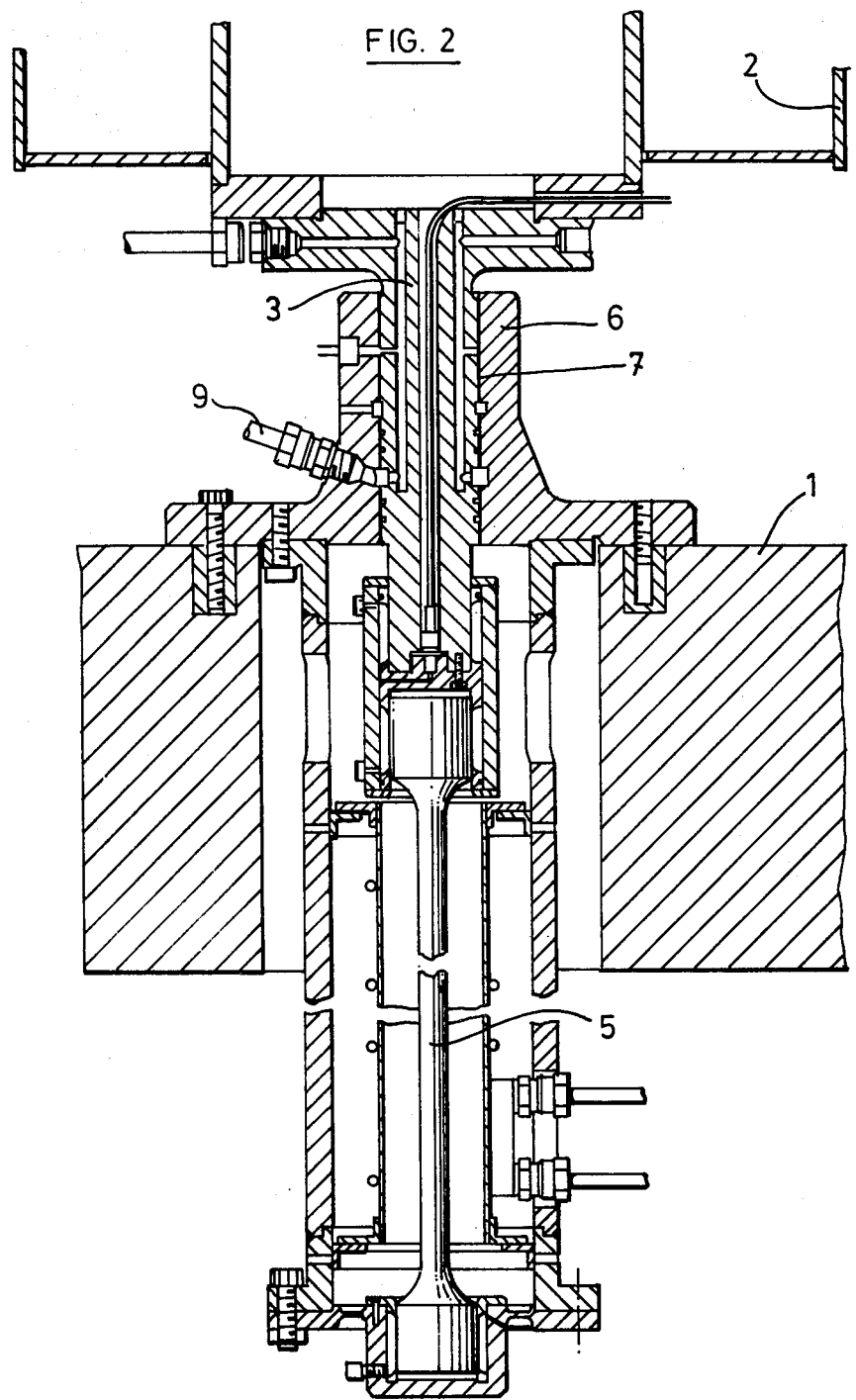
FIG. 2 shows a vertical section of the central area of the machine.

The oscillating table 2 is supported on the fixed plate 1 by means of three pneumatic support devices 4 arranged symmetrically around a vertical rotary shaft 3 suspended to the horizontal part 21 of the oscillating table 2. The rotary shaft 3 extends through the fixed plate 1 and is fixed at one end to a torsion bar 5, the latter having its other end fixed to the said fixed plate 1 by way of hydraulic chucks. The torsion bar 5 ensures the reciprocating motion of the oscillating table 2 about the axis I of the shaft 3. The rotary shaft 3 is centered in the central opening in the fixed plate 1 by a radial bearing, an exemplary embodiment of which is illustrated in FIG. 2 showing a vertical section of the central area of the machine. The plate 1 supports a cylinder 6 comprising a pneumatic radial bearing 7 which ensures the centering of shaft 3 by means of a compressed gas flowing between the shaft 3 and the inner wall of the cylinder 6. The shaft 3 is also provided with a device for delivering compressed air 9 to the support devices 4.

Figure 3:
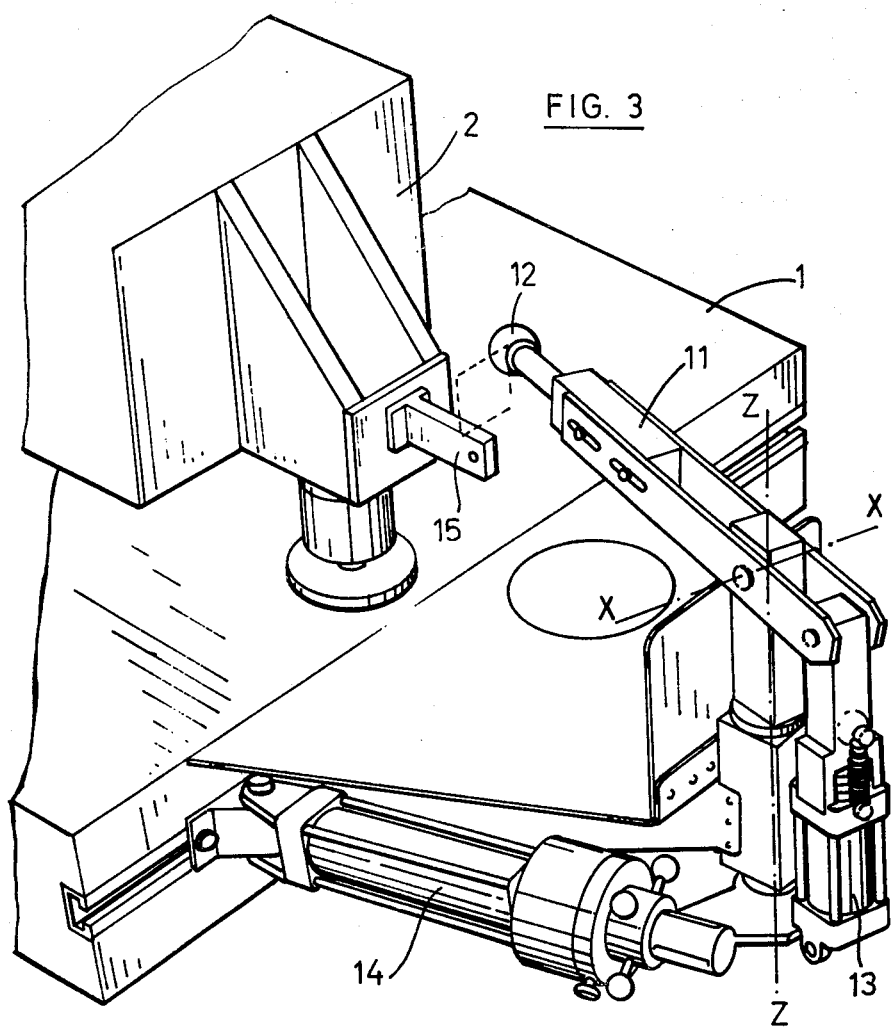
FIG. 3 is a partial view in perspective showing an embodiment of the starting device.

A starting device is associated with the oscillating table 2 for precisely determining the starting position of the oscillating table and automatically bringing the latter into the said position for each start so as to ensure a smooth and perfectly reproducible start each time. This arrangement also permits the starting of the oscillation by remote control in such a way that the measurements may be taken in a vacuum chamber in order to eliminate the detrimental effects of an air mass flow. A pneumatic embodiment of this starting device is illustrated in FIG. 3. This pneumatically controlled version has the advantage of avoiding any contamination from the atmosphere surrounding the tested specimen.

The device shown in FIG. 3 comprises a lever 11 mounted on the fixed plate 1 so as to be capable of pivoting about a horizontal axis X—X and about a vertical axis Z—Z. The lever 11 is actuated by a pair of pneumatic cylinders 13 and 14. This device is controlled in two stages from a console or control desk (not shown). The cylinder 13 is actuated in such a way that the head 12 of the lever 11 is moved downwards until it is situated opposite a push piece 15 mounted on the oscillating table 2. When the lever 11 has completed this movement, a pneumatic valve (not shown) opens automatically and actuates the cylinder 14: the result of the latter is to move the head 12 of the lever 11 into a horizontal plane in such a way that it pushes the push piece 15, bringing the table 2 into the required starting position, thus creating the desired torque in the torsion bar 5 connected to the table 2 (cf. FIG. 1). The cylinder 13 is therefore actuated to move the lever 11 upwards, the head 12 of the lever thus releasing the push piece 15: the torque of the bar 5 therefore starts the oscillation of the table 2. At the end of this vertical movement of the lever 11, a pneumatic valve opens automatically and actuates the cylinder 14 to bring the lever 11 into its initial position.

Figure 4:
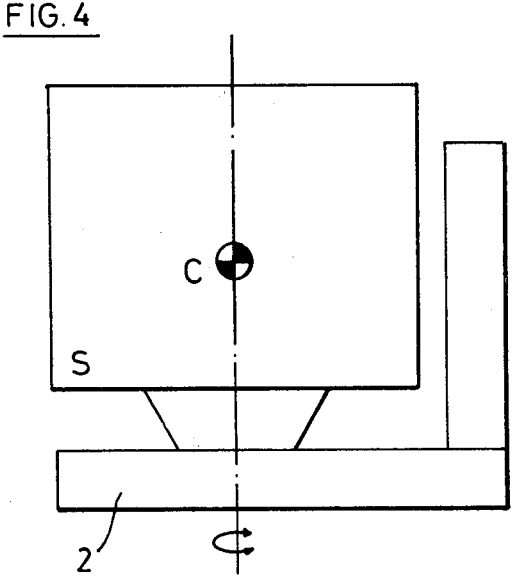
FIGS. 4 and 5 are schematic diagrams showing the configuration of the machine for measuring the moment of inertia relative to two axes.
Figure 5:
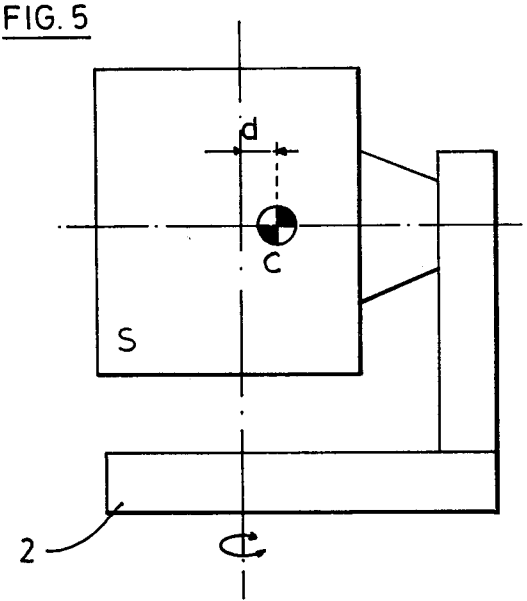

This machine permits the moment of inertia of an engine or device relative to two axes to be measured with precision. FIGS. 4 and 5 schematically illustrate the configuration of the machine/engine unit for these two measurements. FIG. 4 shows the configuration for measuring the moment of inertia relative to its rolling axis: the engine S is fixed on the horizontal part of the oscillating table 2 with its rolling or lateral axis, which is supposed to pass through the center of gravity of the engine, coinciding with the axis of the rotary shaft 3 of the machine.

FIG. 5 shows the configuration for measuring the lateral moment of inertia: the engine S is fixed on the vertical part of the oscillating table 2 with its axis perpendicular to the axis of the shaft 3. The distance d designates the distance between the center of gravity C and the axis of rotation of the machine; it should be as small as possible in order to reduce errors in the measurement of the lateral moment of inertia due to inaccurate measurement of the distance d, that is to say, from the position of the center of gravity on the rolling axis.

In this type of machine it is known that, if the torque is proportional to the angular displacement of the engine to be tested, the moment of inertia can be determined by measuring the period of oscillation after the machine is calibrated with the required precision with a body having a known moment of inertia.

In order to take measurements of the amplitudes and period of oscillation, the machine must be associated with optical and/or electronic measuring apparatus.

The period of oscillation of the table 2 is measured by means of an optical device which does not disturb oscillation. An embodiment is illustrated in FIG. 6. Attached to the oscillating table 2 is a plane mirror 61 intended for cooperation with a device mounted on the fixed plate 1. This latter device comprises a light source 62, a parabolic mirror 63 and a photoelectric cell 64. The beam of light emitted by the source 62 through a slit 65 is reflected by the parabolic mirror 63 in the direction of the plane mirror 61; the latter reflects this beam of light in a direction dependent on the angular position of the table 2. When the latter oscillates, the light beam from the parabolic mirror 63 is reflected by the mirror 61 with each reciprocating action of the oscillation. During the passage of this beam, the parabolic mirror 63 reflects it in turn and with each movement of the table through the zero position, this beam reflected by the mirror 63 illuminates the photoelectric cell 64 which produces an electric pulse. The frequency of these pulses is equal to twice the oscillation frequency of the table 2. The photoelectric cell 64 is illuminated through a slit 66 so as to be illuminated only briefly and to generate a non-resonant pulse. The pulses of the photoelectric cell are transmitted to an electronic recorder or counter, if necessary, through an electronic frequency divider in order to reset the frequency of these pulses to that of the oscillating table 2.

The amplitude of oscillation of the table 2 is measured by means of photoelectric circuit breakers situated on the fixed plate 1 in a circle about the axis of oscillation in predetermined angular positions, the said circuit breakers cooperating with a flange or lug fixed below the oscillating table 2, as shown in FIG. 7. Each photoelectric circuit breaker 71 comprises a source of infra-red rays 72 which illuminate a phototransistor 73. The various circuit breakers are connected in a signaling circuit comprising visual indicators provided on the control desk (not shown). The flange or lug 74 fixed to the oscillating table 2, when moving during oscillation of the table 2, interrupts the light beam 75 which illuminates the photo-transistor 73, the latter therefore generating an electric pulse which serves to switch on an associated signal lamp on the control desk.

What is claimed is:

1. A machine for measuring the difference between two moments of inertia of an engine or unit about two ortogonal axes, the said machine comprising: a fixed horizontal plate having a central opening, an oscillating table mounted with a vertical rotary shaft coupled with a torsion bar so as to be capable of oscillation about the longitudinal axis of said rotary shaft,
    said oscillating table comprising a horizontal part having first fastening means for securing the engine or unit and a vertical part rigidly fixed to the horizontal part, said vertical part having second fastening means for the engine or unit,
    said oscillating table being supported on the fixed plate by means of a plurality of pneumatic support devices spaced from an arranged symmetrically around the rotary shaft, with the said rotary shaft extending through the fixed plate and being centered in the central opening in said fixed plate by radial bearing means.

2. A machine as claimed in claim 1, wherein the rotary shaft is provided with a device for delivering compressed air to the pneumatic support devices.

3. A machine as claimed in claim 1, wherein the oscillating table carries a push piece and the fixed plate supports a starting device, the starting device comprising: a lever mounted in such a manner that its head cooperates with the said push piece, and an actuating means responding to an external control signal in order to actuate the said lever so that the head of the lever moves the oscillating table into a predetermined angular starting position and then releases the movement of the oscillating table.

* * * * *